(12) United States Patent
Lee

(10) Patent No.: US 9,404,548 B2
(45) Date of Patent: Aug. 2, 2016

(54) ADAPTABLE DAMPER

(71) Applicant: CHI HUA FITNESS CO., LTD., Hsinchu County (TW)

(72) Inventor: Ying-Che Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 0 days.

(21) Appl. No.: 14/933,685

(22) Filed: Nov. 5, 2015

(65) Prior Publication Data

US 2016/0061281 A1 Mar. 3, 2016

Related U.S. Application Data

(63) Continuation-in-part of application No. 14/105,289, filed on Dec. 13, 2013.

(51) Int. Cl.
*F16F 15/03* (2006.01)
*F16F 6/00* (2006.01)

(52) U.S. Cl.
CPC ............. *F16F 6/005* (2013.01); *F16F 15/035* (2013.01)

(58) Field of Classification Search
CPC ..... F16F 15/03; F16F 15/035; F16F 2232/06; F16F 6/005; F16F 2222/06; F16F 2232/04
USPC ............. 188/134, 267, 290, 381; 280/5.502, 280/5.507, 5.514, 5.515
See application file for complete search history.

(56) References Cited

U.S. PATENT DOCUMENTS

| | | | | |
|---|---|---|---|---|
| 3,876,040 A | * | 4/1975 | Yang | F16F 7/1022 188/129 |
| 3,983,965 A | * | 10/1976 | Wright, Jr. | F16F 7/1022 188/129 |
| 4,054,189 A | * | 10/1977 | Klaue | B60T 1/065 188/106 F |
| 4,103,760 A | * | 8/1978 | Yang | F16F 7/1022 188/134 |
| 4,253,551 A | * | 3/1981 | Calabrese | F16F 7/1022 188/134 |
| 4,289,218 A | * | 9/1981 | Urano | F16L 3/202 188/134 |
| 4,524,851 A | * | 6/1985 | Sawano | F16F 7/1022 188/134 |
| 7,837,202 B2 | * | 11/2010 | Taneda | B60G 17/0162 280/124.106 |
| 2009/0321201 A1 | * | 12/2009 | Sakuta | F16F 9/052 188/290 |
| 2010/0200343 A1 | * | 8/2010 | Kondo | B60G 13/02 188/267 |
| 2010/0207344 A1 | * | 8/2010 | Nakamura | B60G 13/16 280/124.108 |
| 2011/0254394 A1 | * | 10/2011 | Piaton | F16H 25/2252 310/77 |
| 2013/0181548 A1 | * | 7/2013 | Kakiuchi | H02K 11/215 310/12.29 |

* cited by examiner

*Primary Examiner* — Robert A Siconolfi
*Assistant Examiner* — Mahbubur Rashid
(74) *Attorney, Agent, or Firm* — Rosenberg, Klein & Lee

(57) ABSTRACT

An adjustable damper includes a tube body, a driving rod to be displaced in the tube body and to engage a screw sleeve to drive a screw rod and further a fixed seat for rotation. The fixed seat has a plurality of permanent magnets surrounding for circular rotation and an operation element is driven by a rotating element for repeated linear displacement; a magnetic surface is further arranged on an inner periphery of an annular element of the operation element and an annular gap is arranged between the magnetic surface and the permanent magnets; therefore the displacing annular element is able to adjust a damping force of the driving rod by adjusting an overlapped area of the permanent magnets and a magnetic surface, and further adjust an eddy load formed thereby. The damper overcomes the problem of oil leakage and ensures the durability and quality with its adjustability.

8 Claims, 11 Drawing Sheets

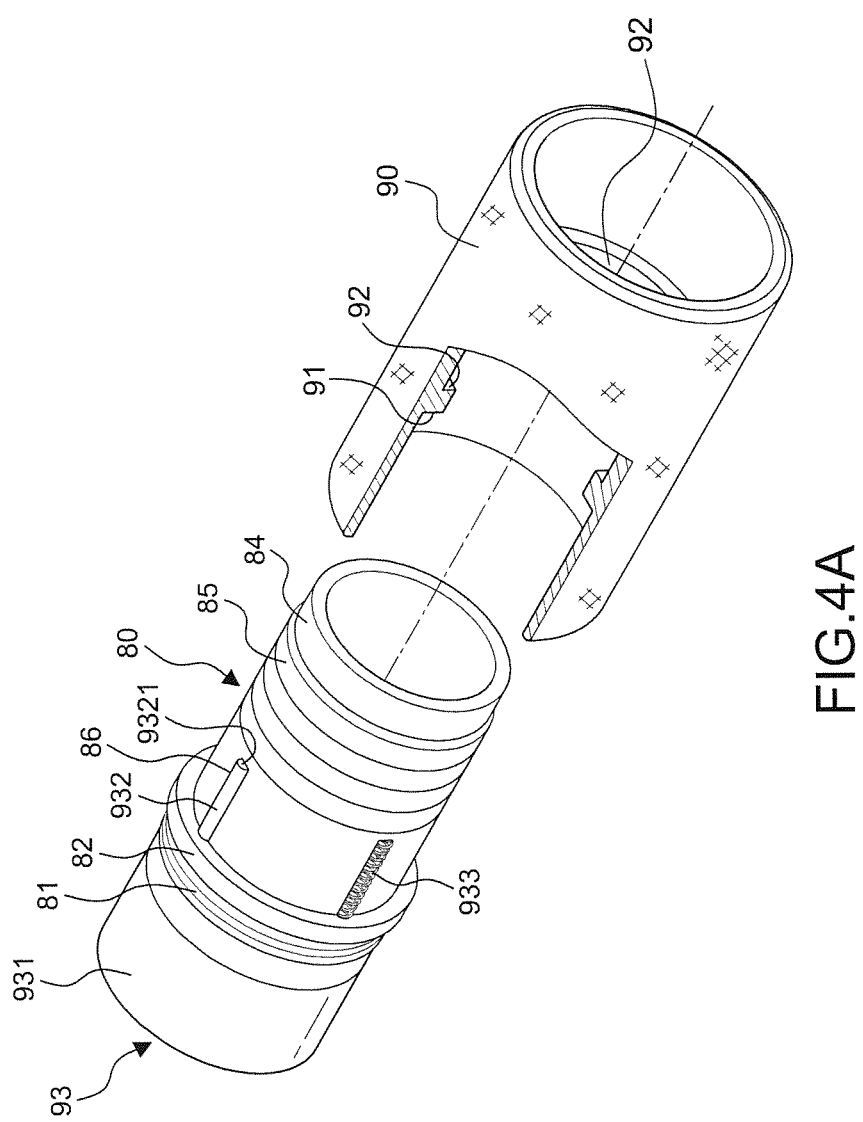

ADAPTABLE DAMPER

This patent application is a continuation-in-part of Ser. No. 14/105,289 filed on Dec. 13, 2013, currently pending.

BACKGROUND OF THE INVENTION

1. Field of the Invention

The invention relates to a linear damper, particularly to one that has a driving rod displacing linearly for a circular rotation operation of a plurality of permanent magnets, so as to adjust a damping force of the driving rod by controlling an overlapped area of the permanent magnets and a magnetic surface, and an eddy load formed thereby.

2. Description of the Related Art

In Indoor sports or rehabilitation equipment, some actuating mechanism such as rowing fitness and strength training machines must have load device or damping device. A foot sports equipment 10 as show in FIG. 1A has a seat 11, two pedals 12 arranged on the seat 11 for stepping thereon, and a damping device 13 connected between the pedals 12 and the seat 11. Due to the limitation of space, the damping device 13 is mostly a hydraulic cylinder as shown in FIG. 1B in application to indoor sports equipment. Such hydraulic cylinder generally includes a cylinder 131, a piston 132 being installed in the cylinder 131 and having a passage 133 arranged thereon and a piston rod 134 at an end thereof, and a predetermined quantity of hydraulic oil 135 filled in the cylinder 131. When the piston rod 134 displaces linearly in the cylinder 131 subject to an axial force, the hydraulic oil 135 would pass through the passage 133 on the piston 132 to produce the damping effect.

The piston rod 134 of the conventional hydraulic damping device 13 has frequent frictions with an oil seal 136 due to the back and forth operation, resulting in an oil leakage problem fouling ground and equipment, and affecting the damping function of the device. Moreover, after a period of using the hydraulic oil, the viscosity of the hydraulic oil will change, and it is susceptible to high temperatures, causing an instability damping effect. Also, the hydraulic oil will have to flow from the piston to the other side during the operation; since the reaction speed of the exchanging path of the hydraulic oil is slow, the exercise equipment cannot be performed well.

The present inventor therefore has disclosed a linear damper in the U.S. patent application Ser. No. 14/105,829 as shown in FIG. 2. The main features of the linear damper is that a driving rod 30 is linearly displacing in a tube body 20, rotating a fixed seat 60 by having a screw sleeve 40 driving a screw rod 50 for rotation; then a plurality of permanent magnets 63 arranged on the fixed seat 60 would be operated in circle rotation, forming a torque by an eddy current produced between the permanent magnets 63 and a magnetic surface 73 of a cover 70, so as to provide a buffer and damping force. The subject invention has avoided problems of oil leakage and unstable damping effect, but the eddy current produced between the permanent magnets 63 and the magnetic surface 73 is unchanging; in other words, the device can only provide certain degree of the torque. However, for users of fitness equipment, an unchanging degree of damping force cannot meet the need of fitness training since different degree of the damping force is needed in different stages of the training. Therefore, the present inventor has been diligently working in a device with adjustable damping force for its users.

SUMMARY OF THE INVENTION

A primary object of the present invention is to provide an adjustable damper to solve a problem of oil leakage in the prior art and to ensure longer durability and better quality of the damper.

Another object of the present invention is to provide an adjustable damper that provides a stable damping force and reacts rapidly during operation to achieve better efficiency.

Yet another object of the present invention is to provide an adjustable damper for its user to easily change a torque needed in fitness training process, allowing different needs at different training stages.

To achieve the above objects, the present invention comprises a tube body having a first through hole at an end, a second through hole at the other end, and a first axial passage connecting through the first through hole and the second through hole; an engaging element having a first engaging portion at an end, a second engaging portion at the other end, and a second axial passage connecting through the first engaging portion and the second engaging portion; said second engaging portion having an outer threaded section and engaging in the second through hole of the tube body; a driving rod having a third axial passage arranged therein, an inner end to be engaged in the first and second axial passage, and an outer end stretching out from the first through hole and having a first pivot portion; a screw sleeve engaging the inner end of the driving rod for linear displacement in the first and second axial passage; a screw rod including a shaft section and a thread section to be screwed with the screw sleeve, said thread section being arranged in the third axial passage and the screw sleeve for the screw sleeve to displace linearly and for the screw rod to be rotatable; a fixed seat having a rotatable inner ring portion mounted on the shaft section to be driven to rotate and an outer ring portion having a plurality of permanent magnets encircling an outer surface thereof; a rotating element having a pushing surface and an inner threaded section to be screwed with the outer threaded section of the engaging element for the rotating element to rotate linearly along the engaging element by screwing; an operation element including an annular element having a magnetic surface arranged on an inner surface thereof and at least one pushing rod arranged at an end thereof to pass through a flange of the engaging element and to be driven by the pushing surface of the rotating element, for linear displacement of the annular element; said magnetic surface and the plurality of permanent magnets further having an annular gap arranged in-between; the permanent magnets and the magnetic surface thereby being in radially offset relationship relative to each other; a tubular cover having a first end engaging the first engaging portion of the engaging element and a second end engaging a cover with a second pivot portion; said cover having a seating arranged on the inner periphery thereof for engaging the shaft section of the screw rod and for the screw rod to be rotatable in the cover;

Whereby the driving rod displaces linearly in the first and second axial passage when the first pivot portion and the second pivot portion are subject to an axial force, driving the screw sleeve to rotate the screw rod and further driving the fixed seat for rotation, so that the permanent magnets are operating in a circular rotation motion; then a torque is produced by an eddy load formed between the permanent magnets and the magnetic surface and subject to repeated displacement of the annular element of the operation element, so as to adjust the damping force of the driving rod with linear displacement.

In addition, at least one spring is arranged between the engaging element and the annular element so that the annular element would move back to an original place before operation when the spring returns from stretching; and at least one engaging ditch is arranged on the surface of the engaging element for disposing the pushing rod and the spring so that the annular element of the operation element is able to stably perform linear displacement.

Furthermore, the permanent magnets are composed of a plurality of rubidium magnets. The magnetic surface is formed by an annular magnetic element fixed on an inner periphery of the annular element. The first pivot portion is an oil-bearing or a tube perpendicularly passing through the outer end of the driving rod; the cover further has a convex lug arranged aside, and the second pivot portion is an oil-bearing or tube perpendicularly passing through the convex lug. The screw sleeve is formed in one-piece on the inner periphery of the third axial passage.

Based on the features disclosed above, the present invention has the linear displacement of the driving rod driving the permanent magnets for circular rotation, so as to form a torque from an eddy load produced between the permanent magnets and the magnetic surface, solving the problem of oil leakage and ensuring durability and quality by replacing hydraulic oil by damping force. Also, without the defect of slow reaction in a conventional hydraulic cylinder, the present invention is able to react fast in either stretching or contracting status and provide a stable damping force in the operation, achieving better efficiency. Furthermore, the present invention can easily change a torque needed in fitness training process by adjusting an overlapped area of the permanent magnets and magnetic surface to provide different strength of damping force, allowing different needs in different training stages.

BRIEF DESCRIPTION OF THE DRAWINGS

FIG. 4A is an enlarged schematic view illustrating an operation element engaging an engaging element in the present invention;

DETAILED DESCRIPTION OF THE PREFERRED EMBODIMENT

Figure 1A:
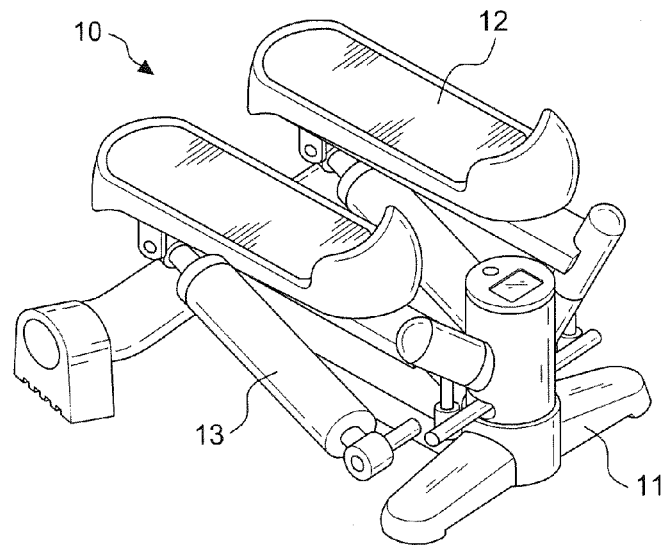
FIG. 1A is a perspective view of a conventional fitness equipment.
Figure 1B:
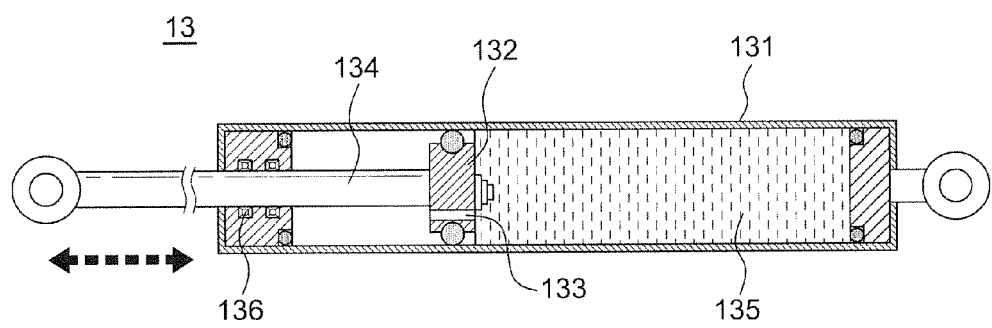
FIG. 1B is a sectional view of a conventional hydraulic cylinder structure.
Figure 2:
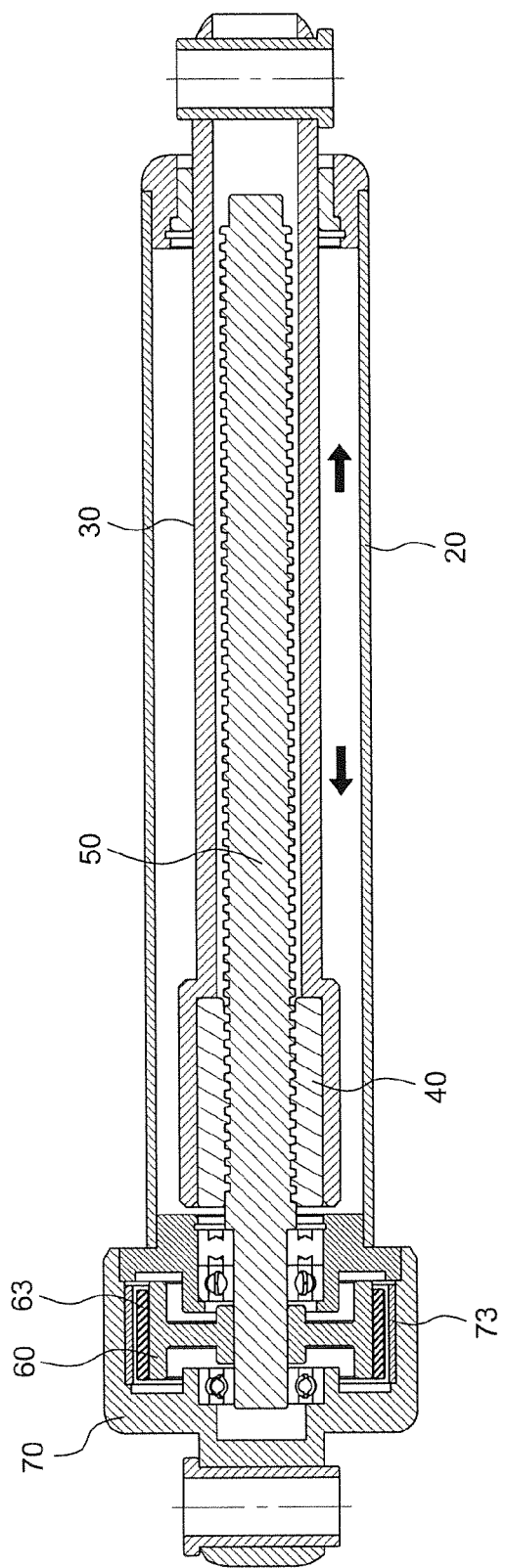
FIG. 2 is a sectional view of an invention disclosed in U.S. patent application Ser. No. 14/105,289.
Figure 3:
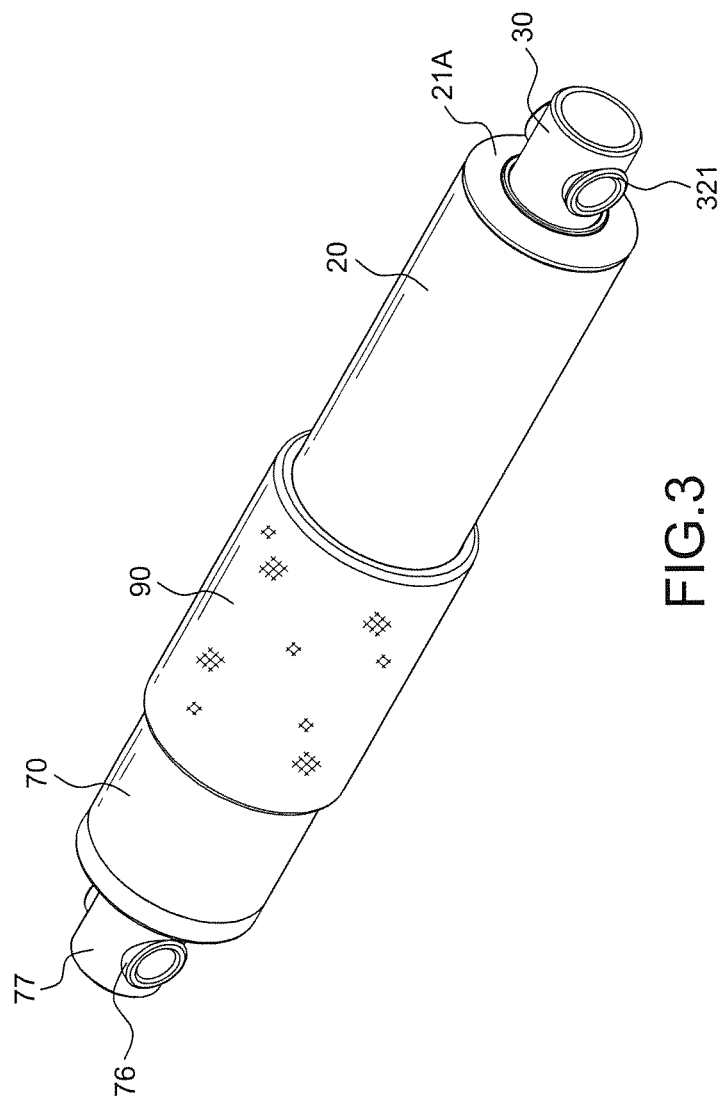
FIG. 3 is a perspective view of the present invention in a preferred embodiment.
Figure 4:
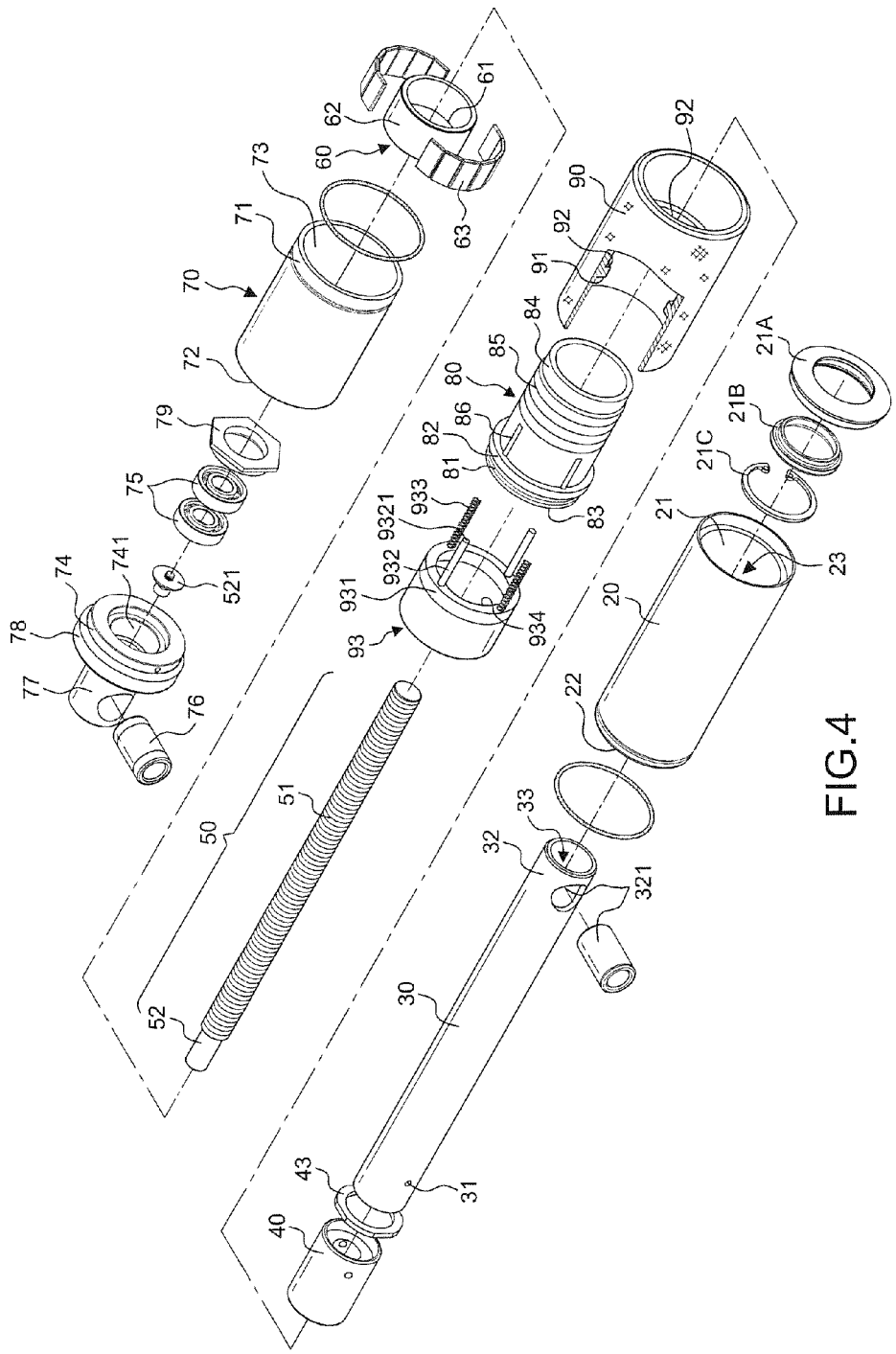
FIG. 4 is an exploded view of the present invention in a preferred embodiment.

Referring to FIGS. 3 to 6, in a preferred embodiment the present invention comprises a tube body 20, a driving rod 30, an engaging element 80, a screw sleeve 40, a screw rod 50, a fixed seat 60, a rotating element 90, an operation element 93, a tubular cover 70, a second axial sleeve 79, and a cover 74.

The tube body 20 has a first through hole 21 at an end, a second through hole 22 at the other end, and a first axial passage 23 connecting through the first through hole 21 and the second through hole 22. The driving rod 30 has an inner end 31 to be displaced in the tube body 20, an outer end 21 stretching out from the first through hole 21, and a third axial passage 33 connecting through the inner end 31 and the outer end 21. In this embodiment, the first through hole 21 of the tube body 20 engages a first axial sleeve 21A, and a bush 21B is disposed in-between the inner periphery of the first axial sleeve 21A and the driving rod 30 by a C ring 21C. The driving rod 30 further has a first pivot portion 321 at the outer end 32 thereof, perpendicularly engaging through the outer end 32 of the driving rod 30; the outer end is either an oil-bearing or a tube in the embodiment.

The engaging element 80 has a first engaging portion 81 and a flange 82 at an end, a second engaging portion 84 and an outer threaded section 85 at the other end, and a second axial passage 83 connecting through the first engaging portion 81 and the second engaging portion 84. The second engaging portion 84 fixedly engages the second through hole 22 of the tube body 20 to connect the first axial passage 23 and the second axial passage 83. Moreover, the engaging element 80 has four engaging ditches 86 arranged on the surface thereof in semicircle shape in this embodiment.

The screw sleeve 40 engages the inner end 31 of the driving rod 30 and has a fixing element 43 fixating the position thereof for linear displacement in the first axial passage 33 and the second axial passage 83. In this embodiment, the screw sleeve 40 is a small element engaging in the inner end 31; in another embodiment, the screw sleeve 40 is formed in one-piece on the inner periphery of the third axial passage 33. The screw rod 50 includes a thread section 51 to be screwed with the screw sleeve 40 and a shaft section 52, so that the screw rod 50 is driven by the linear displacement of the screw sleeve 40 for rotation.

The fixed seat 60 has a rotatable inner ring portion 61 mounted on the shaft section 52 to be driven to rotate and an outer ring portion 62 having a plurality of permanent magnets 63 encircling an outer surface thereof. In the embodiment, the permanent magnets 63 are composed of a plurality of rubidium magnets that have strong magnetic force with small volume, but the present invention is not limited to such application.

The rotating element 90 has a pushing surface 91 and an inner threaded section 92 to be screwed with the outer threaded section 85 of the engaging element 80 for the rotating element 90 to rotate linearly along the engaging element 80 by screwing. The operation element 93 includes an annular element 931 having a magnetic surface 934 arranged on an inner surface thereof to be arranged corresponding to the permanent magnets 63 of the annular element 931; the permanent magnets 63 and the magnetic surface 934 further have an annular gap 94 arranged in-between. In this embodiment, the magnetic surface 934 includes two semi-circle copper pieces fixedly arranged on the inner periphery of the annular element 931, but the present invention is not limited to such application. The annular element 931 further has at least one pushing rod 932 arranged at an end thereof to pass through a flange 82 of the engaging element 80 and to move along the engaging ditches 86. The pushing rod 932 further has a contact end 9321 to contact the pushing surface 91 during operation. In this embodiment, two pushing rods 932 and two springs 933 are symmetrically and individually arranged to engage the engaging ditches 86; the springs 933 has an end fixed at the end of the annular element 931 where the pushing rods 932 are arranged as well, and has the other end fixed at the far end of the engaging ditches 86 for operation.

Figure 5A:
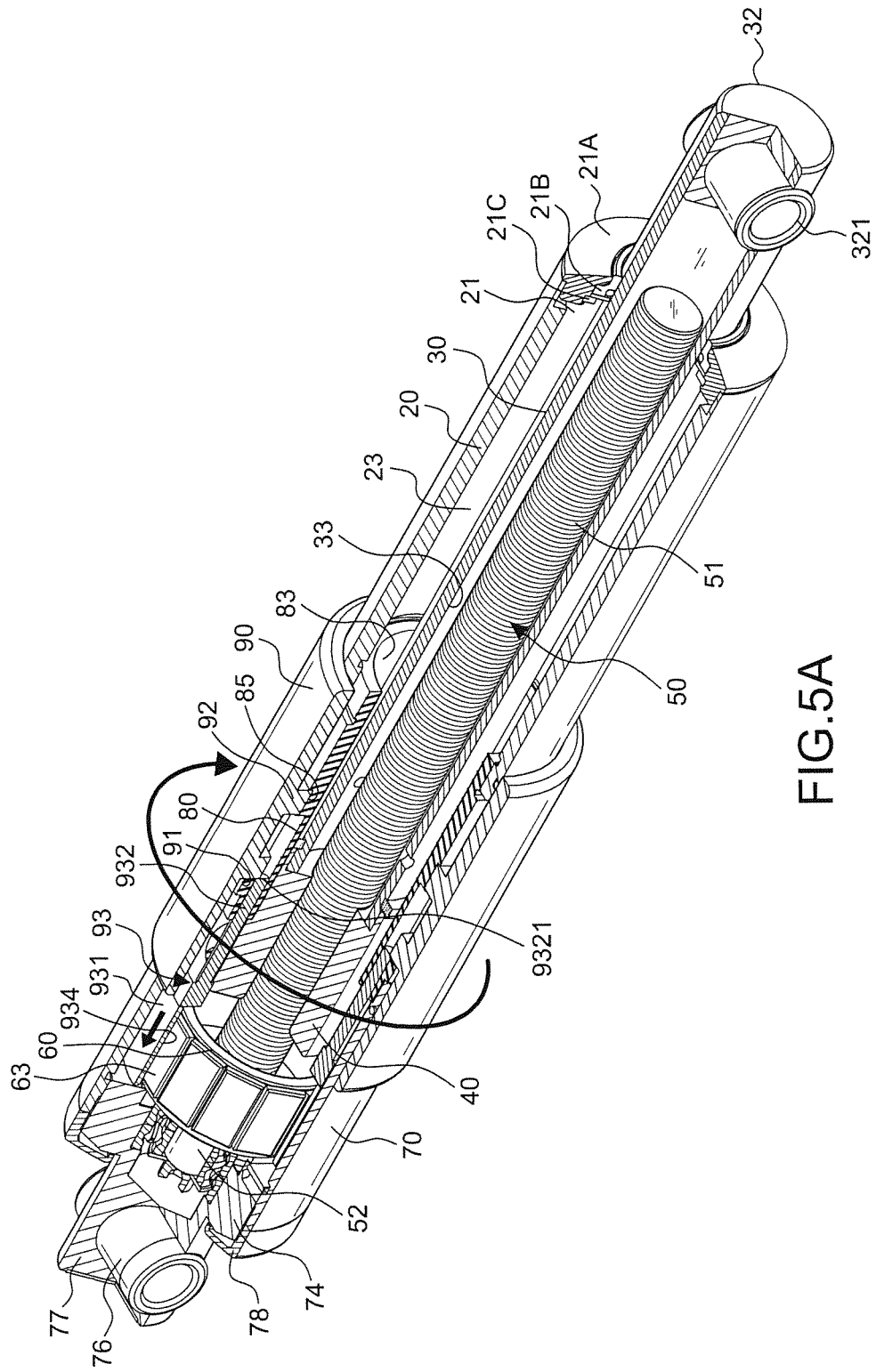
FIG. 5A is a sectional view of the present invention with a maximum damping force.
Figure 6A:
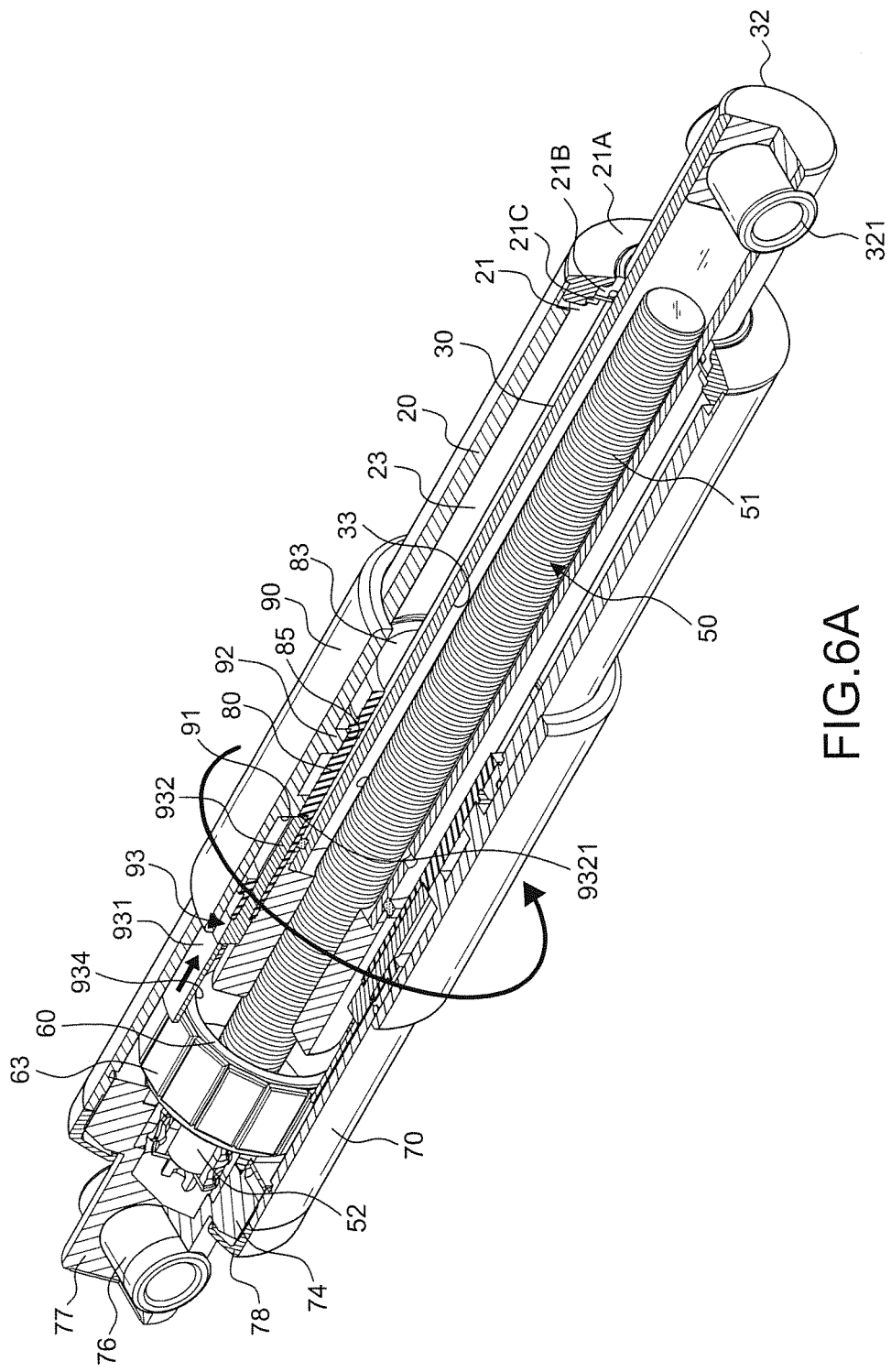
FIG. 6A is a sectional view of the present invention with a minimum damping force.

With reference to FIG. 5A, when the rotating element 90 is rotated clockwise, the pushing surface 91 would contact the contact ends 9321 of the pushing rods 932 and push the pushing rods 932 to drive the annular element 931 of the operation element 93 for linear displacement, moving farther from the engaging element 80, thus increasing the overlapped area of the magnetic surface 934 and the permanent magnets 63 and stretching the springs 933; with reference to FIG. 6A, when the rotating element 90 is rotated counter-clockwise, the stretching springs 933 would contract and pull back the annular element 931 of the operation element 93 toward the engaging element 80, thus decreasing the overlapped area of the magnetic surface 934 and the permanent magnets 63.

The tubular cover 70 has a first end 71, a second end 72, and a fourth axial passage 73 connecting through the first end 71 and the second end 72. The first end 71 engages the first engaging portion 81 of the engaging element 80 to connect the fourth axial passage 73 and the second axial passage 83, and the fourth axial passage 73 has the space for disposing the fixed seat 60 and the magnetic surface 934 of the operation element 93. The second axial sleeve 79 is fixedly disposed in the fourth axial passage 73 near the second end 72 of the tubular cover 70. Two bearings 75 are mounted on the shaft section 52 of the screw rod 50 and fixed by a screw 521. The cover 74 has a seating 741 arranged on the inner periphery thereof to be mounted with the second end 72 of the tubular cover 70 for the bearings 75 to be disposed between the seating 741 and the second axial sleeve 79, so that the shaft section 52 of the screw rod 50 are fixed in position and the screw rod 50 is rotatable in the cover 74. Further, the cover 74 has a second pivot portion 76 arranged at a far end from the tubular cover 70. In this embodiment, the cover 74 further has a convex lug 77 arranged aside, and the second pivot portion 76 is an oil-bearing or tube perpendicularly passing through the convex lug 77; a protective cover 78 is further mounted on the cover 74, fixing the connecting form of the cover 74 and the tubular cover 70.

Whereby the driving rod 30 and the screw sleeve 40 displace linearly in the first and second axial passage 23, 83 when the first pivot portion 321 and the second pivot portion 76 are subject to an axial force, driving the screw sleeve 40 to rotate the screw rod 50 and further driving the fixed seat 60 of the shaft section 52 for rotation, so that the permanent magnets 63 are operating in a circular rotation motion; then a torque is produced by an eddy load formed between the permanent magnets 63 and the magnetic surface 934 and is subject to repeated displacement of the annular element 931 of the operation element 93, so as to adjust the damping force of the driving rod 30 with linear displacement.

The structure of an adjustable damper disclosed above uses an eddy current resistance formed by position changes of a conductor in a magnetic field. It has the conductor moving in the magnetic field and the magnetic fields would react in accordance with the change, forming a magnetic force—an eddy current resistance. Moreover, according to Maxwell's Equation, the intensity of magnetic force is in direct proportion to the square of magnetic flux density. The magnetic force can be applied to fitness equipment for a supply for the buffer or damping load. In this embodiment, the present invention has an overlapped area between the permanent magnets 63 and the magnetic surface 934 to be the variable factor in changing the magnetic flux density and thus adjusting the damping force for fitness equipment.

Figure 5B:
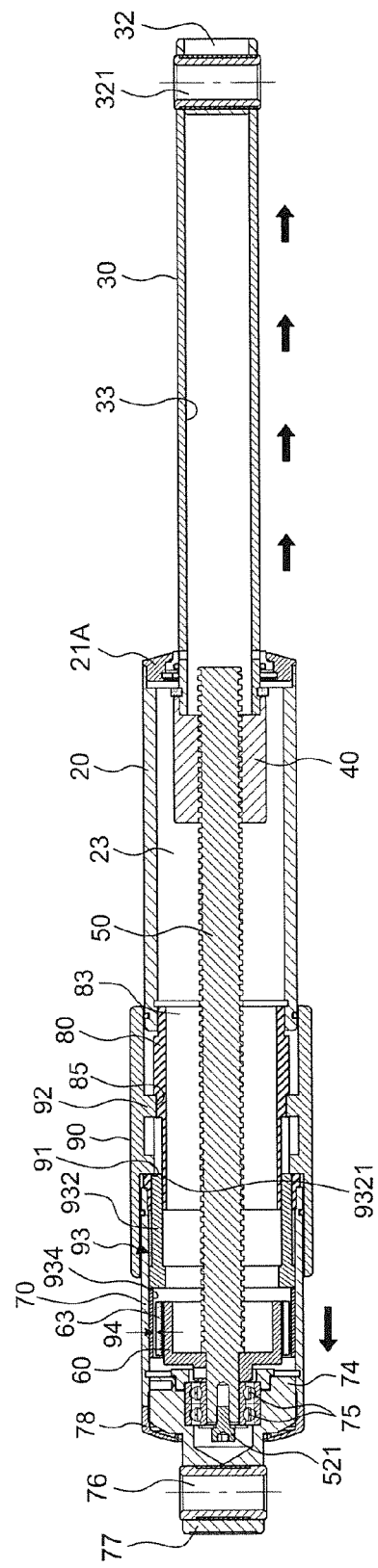
FIG. 5B is a sectional view of the present invention with a maximum damping force in a linearly stretching position.
Figure 5C:
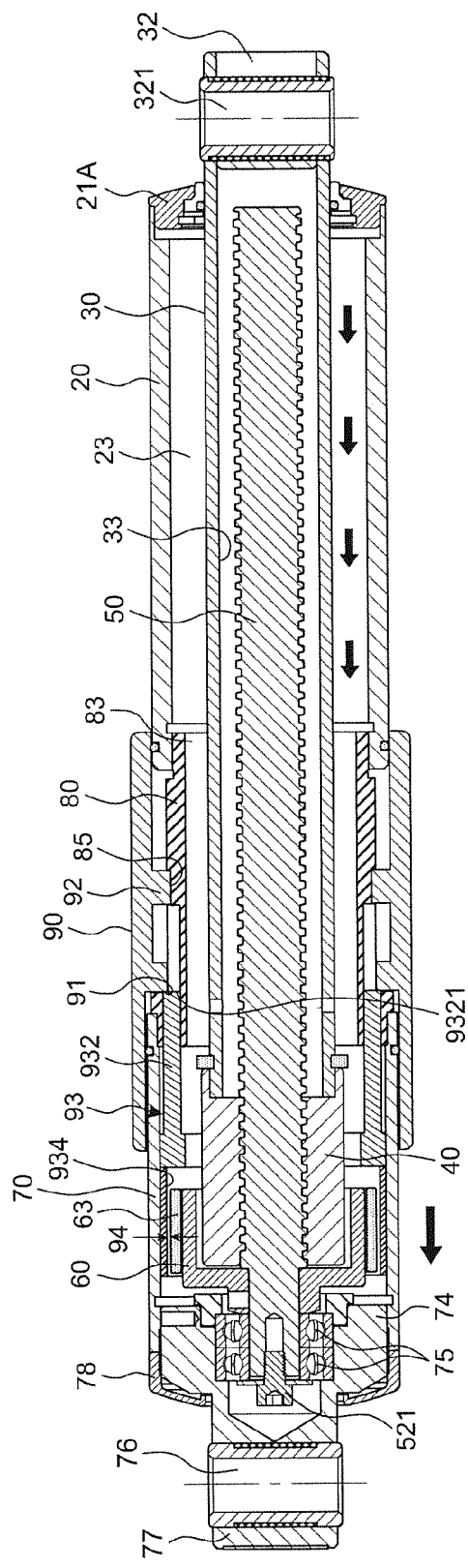
FIG. 5C is a sectional view of the present invention with a maximum damping force in a linearly contracting position.

FIGS. 5A to 5C are sectional views of the present invention with a maximum damping force. The rotating element 90 is rotated clockwise, causing the pushing surface 91 pushing the contact ends 9321 of the pushing rods 932 and also the pushing rods 932 to drive the annular element 931 of the operation element 93 for linear displacement, moving farther from the engaging element 80, and thus increasing the overlapped area of the magnetic surface 934 and the permanent magnets 63. When the magnetic surface 934 entirely leaves the permanent magnets 63, the damping force reaches the maximum value. FIG. 5B further shows the driving rod 30 being pulled to displace outward from the tube body 20. Then the screw rod 50 is driven by the screw sleeve 40 for rotation in outward displacement to drive the fixed seat 60 rotating in counter-clockwise direction. FIG. 5C is a sectional view illustrating the driving rod 30 displacing back into the first and second axial passage 23, 83. By having the screw sleeve 40 driving the screw rod 50 for rotation, the fixed seat 60 is driven for rotation in clockwise direction for the permanent magnets 63 to be in circular rotation, and then a torque is produced by an eddy load formed between the magnetic surface 934 and the permanent magnets 63. When the magnetic surface 934 entirely overlaps with the permanent magnets 63, the damping force also reaches the maximum value. In other words, the displacement of the driving rod 30 decides the rotating direction of the fixed seat 60.

Figure 6B:
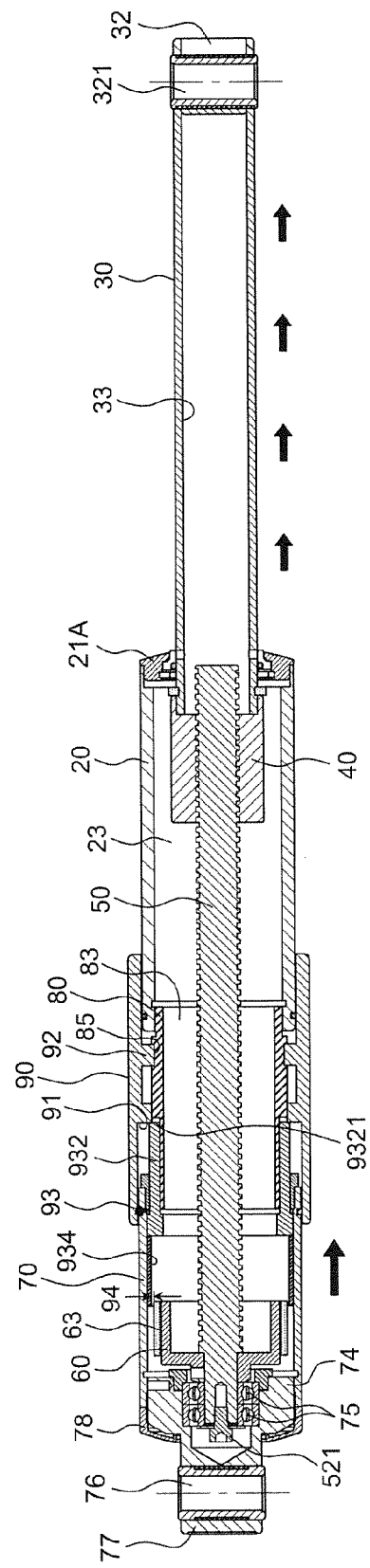
FIG. 6B is a sectional view of the present invention with a minimum damping force in a linearly stretching position.
Figure 6C:
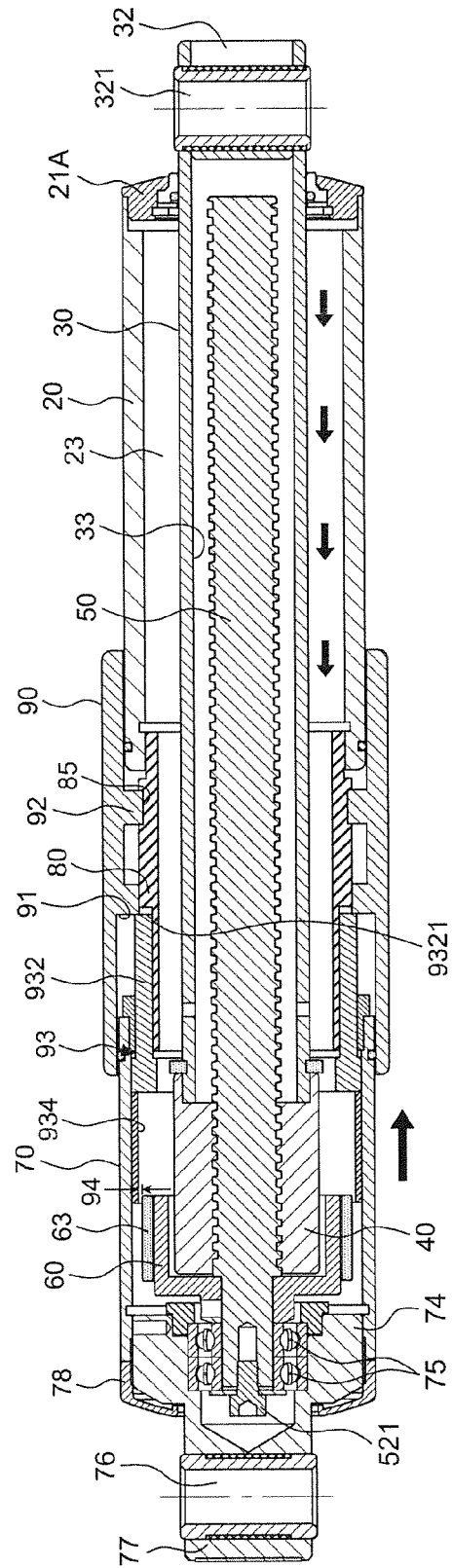
FIG. 6C is a sectional view of the present invention with a minimum damping force in a linearly contracting position.

FIGS. 6A to 6C are sectional views of the present invention with lessening damping force. Previously when the rotating element 90 is rotated clockwise, the springs 933 are stretched; then when the rotating element 90 is rotated counter-clockwise, the stretching springs 933 would contract and pull back the annular element 931 of the operation element 93 toward the engaging element 80, thus decreasing the overlapped area of the magnetic surface 934 and the permanent magnets 63. When the magnetic surface 934 entirely leaves the permanent magnets 63, the damping force reaches the minimum value. FIG. 6B further shows the driving rod 30 being pulled to displace outward from the tube body 20. Then the screw rod 50 is driven by the screw sleeve 40 for rotation in outward displacement to drive the fixed seat 60 rotating in counter-clockwise direction. FIG. 6C is a sectional view illustrating the driving rod 30 displacing back into the first and second axial passage 23, 83. By having the screw sleeve 40 driving the screw rod 50 for rotation, the fixed seat 60 is driven for rotation in clockwise direction for the permanent magnets 63 to be in circular rotation; actually, whether the fixed seat 60 rotates in clockwise or counter-clockwise, the permanent magnets 63 will be driven in circular rotation, and then a torque is produced by an eddy load formed between the magnetic surface 934 and the permanent magnets 63. When the magnetic surface 934 entirely leaves the permanent magnets 63, the damping force also reaches the minimum value.

A conventional hydraulic cylinder has a problem of oil leakage from a piston to the other side during displacements. Besides, when exchanging the stretching path of the driving rod 30, the equipment would not react until the hydraulic oil return; thus the reaction speed and the value of damping force would be obviously different. In contrast, the present invention does not need hydraulic oil for operation, thus avoiding the problem of oil leakage; and the damping force of the present invention is very stable because the eddy current—the damping—formed in the annular gap 94 between the permanent magnets 63 and magnetic surface 934 is a stable value, and the screw rod 50 with the screw sleeve 40 uses the spiral features to improve the lead. Therefore, the present invention is able to react fast and maintain a balanced damping force for better efficiency in operating fitness equipment.

Based on the features disclosed, the linear displacement of the driving rod 30 is converted into circular rotation of the permanent magnets 63, and an eddy load is formed between the permanent magnets 63 and magnetic surface 934 to produce a torque in order to replace conventional hydraulic oil by magnetic resistance, so as to solve the problem of oil leakage and to provide a stable damping force for the fitness equipment. By adjusting the overlapped area of the permanent magnets 63 and magnetic surface 934 and displacement of the driving rod 30, the present invention is able to provide different strength of damping force as a torque needed in fitness training, allowing different needs in different training stages.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustable damper, comprising:
a tube body having a first through hole at an end, a second through hole at the other end, and a first axial passage connecting through the first through hole and the second through hole;
an engaging element having a first engaging portion at an end, a second engaging portion at the other end, and a second axial passage connecting through the first engaging portion and the second engaging portion; said second engaging portion having an outer threaded section and engaging in the second through hole of the tube body;
a driving rod having a third axial passage arranged therein, an inner end to be engaged in the first and second axial passage, and an outer end stretching out from the first through hole and having a first pivot portion;
a screw sleeve engaging the inner end of the driving rod for linear displacement in the first and second axial passage;
a screw rod including a shaft section and a thread section to be screwed with the screw sleeve, said thread section being arranged in the third axial passage and the screw sleeve for the screw sleeve to displace linearly and for the screw rod to be rotatable;
a fixed seat having a rotatable inner ring portion mounted on the shaft section to be driven to rotate and an outer ring portion having a plurality of permanent magnets encircling an outer surface thereof;
a rotating element having a pushing surface and an inner threaded section to be screwed with the outer threaded section of the engaging element for the rotating element to rotate linearly along the engaging element by screwing;
an operation element including an annular element having a magnetic surface arranged on an inner surface thereof and at least one pushing rod with a contact end arranged at an end thereof to pass through a flange of the engaging element and to be driven by the pushing surface of the rotating element, for linear displacement of the annular element; said magnetic surface and the plurality of permanent magnets further having an annular gap arranged in-between; the permanent magnets and the magnetic surface thereby being in radially offset relationship relative to each other;
a tubular cover having a first end engaging the first engaging portion of the engaging element and a second end engaging a cover with a second pivot portion; said cover having a seating arranged on the inner periphery thereof for engaging the shaft section of the screw rod and for the screw rod to be rotatable in the cover;
whereby the driving rod displaces linearly in the first and second axial passage when the first pivot portion and the second pivot portion are subject to an axial force, driving the screw sleeve to rotate the screw rod and further driving the fixed seat for rotation, so that the permanent magnets are operating in a circular rotation motion; then a torque is produced by an eddy load formed between the permanent magnets and the magnetic surface and subject to repeated displacement of the annular element of the operation element, so as to adjust the damping force of the driving rod with linear displacement.

2. The adjustable damper as claimed in claim 1, wherein at least one spring is arranged between the engaging element and the annular element so that the annular element would move back to an original place before operation when the spring returns from stretching.

3. The adjustable damper as claimed in claim 1, wherein at least one engaging ditch is arranged on the surface of the engaging element for disposing the pushing rod and the spring so that the annular element of the operation element is able to stably perform linear displacement.

4. The adjustable damper as claimed in claim 1, wherein the permanent magnets are composed of a plurality of rubidium magnets.

5. The adjustable damper as claimed in claim 1, wherein the magnetic surface is formed by an annular magnetic element fixed on an inner periphery of the annular element.

6. The adjustable damper as claimed in claim 1, wherein the first pivot portion is an oil-bearing or a tube perpendicularly passing through the outer end of the driving rod.

7. The adjustable damper as claimed in claim 1, wherein the cover further has a convex lug arranged aside, and the second pivot portion is an oil-bearing or tube perpendicularly passing through the convex lug.

8. The adjustable damper as claimed in claim 1, wherein the screw sleeve is formed in one-piece on the inner periphery of the third axial passage.

* * * * *